United States Patent
Hall

[19]

[11] Patent Number: 6,035,999
[45] Date of Patent: Mar. 14, 2000

[54] ZONED TRANSPORT CONVEYOR WITH AUTOMATIC ZONE START-UP AND SHUT-DOWN

[75] Inventor: David V. Hall, Cookeville, Tenn.

[73] Assignee: Milwaukee Electronics Corporation, Milwaukee, Wis.

[21] Appl. No.: 09/112,618

[22] Filed: Jul. 9, 1998

[51] Int. Cl.[7] ................................................. B65G 13/06
[52] U.S. Cl. ...................... 198/781.06; 198/783; 198/788
[58] Field of Search .............................. 198/781.06, 783, 198/788

[56] References Cited

U.S. PATENT DOCUMENTS

| | | |
|---|---|---|
| 3,075,630 | 1/1963 | Fisk . |
| 3,485,339 | 12/1969 | Miller et al. . |
| 3,605,986 | 9/1971 | Navin . |
| 3,817,368 | 6/1974 | Wentz et al. . |
| 3,960,262 | 6/1976 | Henig . |
| 3,982,625 | 9/1976 | Wentz et al. . |
| 4,231,465 | 11/1980 | Bourgeois . |
| 4,281,756 | 8/1981 | Bruno . |
| 4,629,058 | 12/1986 | Reissmann et al. . |
| 4,640,408 | 2/1987 | Eaves . |
| 4,653,630 | 3/1987 | Bravin . |
| 4,717,013 | 1/1988 | Reissmann et al. . |
| 4,815,582 | 3/1989 | Canziani . |
| 4,921,092 | 5/1990 | Crawford et al. . |
| 4,962,844 | 10/1990 | Francioni . |
| 5,038,915 | 8/1991 | Delsanto . |
| 5,058,727 | 10/1991 | Jahns et al. . |
| 5,082,103 | 1/1992 | Ross et al. . |
| 5,137,139 | 8/1992 | Ruscello . |
| 5,186,308 | 2/1993 | Munro . |
| 5,228,558 | 7/1993 | Hall . |
| 5,285,887 | 2/1994 | Hall . |
| 5,318,167 | 6/1994 | Bronson et al. . |
| 5,341,916 | 8/1994 | Doane et al. . |
| 5,358,464 | 10/1994 | Funk et al. . |
| 5,456,347 | 10/1995 | Best et al. ........................... 198/781.06 |
| 5,582,286 | 12/1996 | Kalm et al. ........................ 198/781.06 |
| 5,918,728 | 7/1999 | Syverson ................................. 198/788 |

*Primary Examiner*—Joseph E. Valenza
*Attorney, Agent, or Firm*—Andrus, Sceales, Starke & Sawall

[57] ABSTRACT

A zoned transport conveyor includes a drive roller and a series of driven rollers for each zone. A motor is interconnected with the drive roller for imparting rotation to the drive roller, which in turn is drivingly engaged with the driven rollers such as through a series of belts. Introduction of a load onto the zone results in rotation of an upstream one of the driven rollers, which is transferred through the drive arrangement to the drive roller. Rotation of the drive roller results in rotation of an output member associated with the motor, which is detected by a series of sensors associated with the motor and which provides and input to a motor control circuit. The motor control circuit includes a processor for controlling operation of the motor, and the processor functions to initiate operation of the motor when inertial rotation of the motor output member is detected. The processor functions to continue operation of the motor for a predetermined time period sufficient to allow a load to be discharged from the zone, after which operation of the motor is stopped so as to stop operation of the zone until introduction of a subsequent load. A bus spans the length of adjacent zones, and provides power supply and ground to the motor and to the control circuit. The bus may also carry a stop line providing a stop input to the control circuit, and the processor is responsive to a stop signal from the stop line so as to initiate dynamic braking of the motor to quickly stop advancement of any loads carried by the zone.

21 Claims, 3 Drawing Sheets

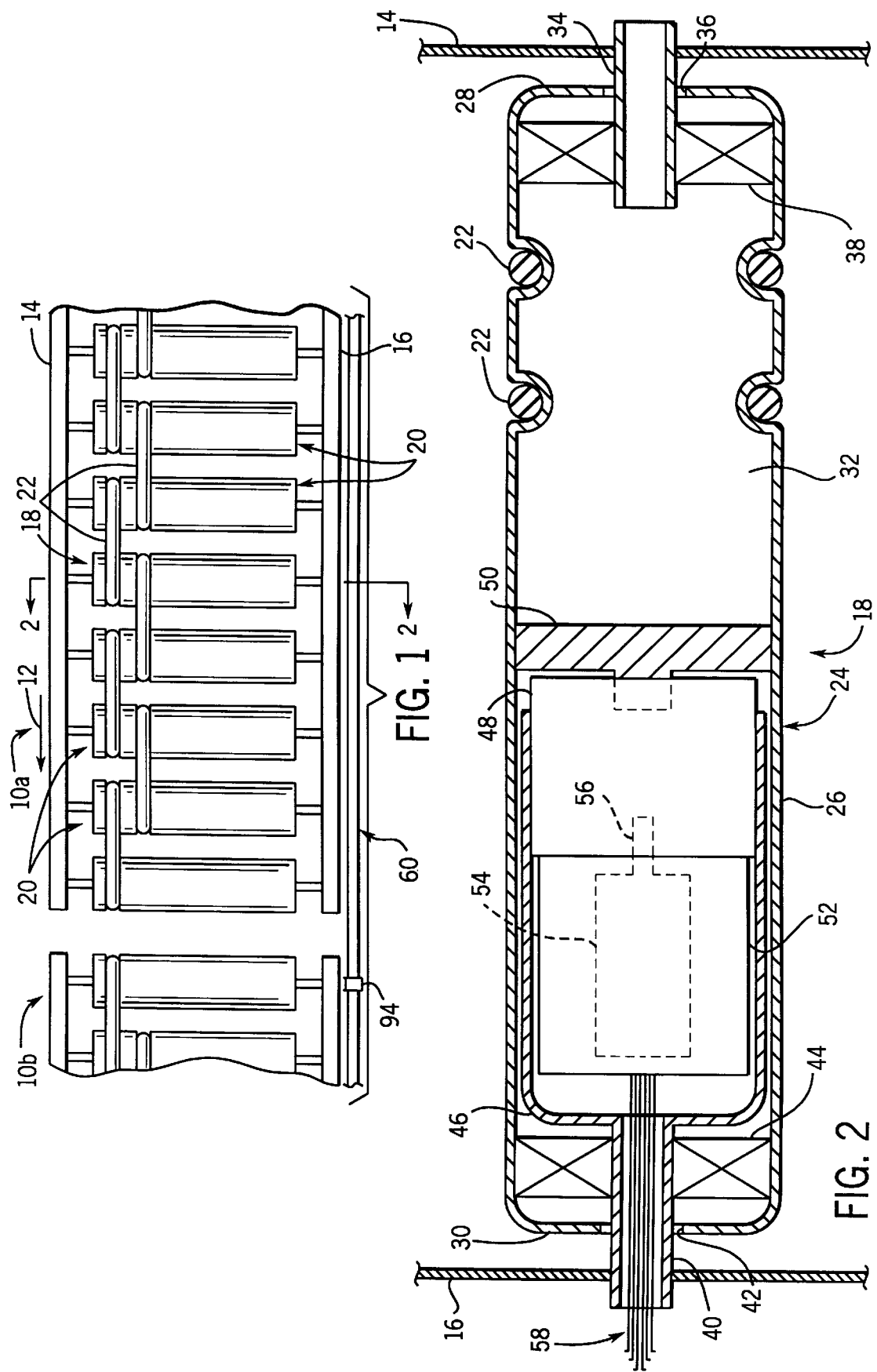

ZONED TRANSPORT CONVEYOR WITH AUTOMATIC ZONE START-UP AND SHUT-DOWN

BACKGROUND AND SUMMARY OF THE INVENTION

This invention relates to a transport conveyor, and more particularly to a sensorless transport conveyor which can be operated so as to selectively stop operation of the conveyor when the conveyor is not being used to transport a load.

Conventional conveyors for transporting individual loads are broadly categorized as either "accumulating" conveyors or "non-accumulating" transport conveyors. Both types of conveyors are typically divided into a series of adjacent conveyor zones, and a motor and drive arrangement is provided for each zone so as to impart rotation to the part of the conveyor which supports the load and transports the load on the conveyor zone, such as a series of conveyor rollers.

Accumulating conveyors are used when it is necessary to keep track of the progress of the individual packages being transported by the conveyor. Each zone of an accumulating conveyor typically includes a sensor at the downstream end for detecting when a load is present at the downstream end of the zone and for providing an input to the downstream and upstream conveyor zones. The motor control of the downstream conveyor zone is responsive to the input so as to operate the downstream zone in a desired manner, i.e. either to operate the zone to advance the load thereon or to accumulate the load on the zone by stopping operation of the zone. The motor control of the upstream conveyor is responsive to the input so as to operate the upstream zone to advance a load on to the conveyor zone downstream therefrom. The sensor input detects when a load is transferred from one zone to another, and can thus be used to stop operation of a zone if the zone is not supporting a load and to resume operation as a load approaches or is transferred to the zone.

Non-accumulating conveyors, also known as transport conveyors, typically include very simple controls and are generally either in an on state in which all zones of the transport conveyor are in operation or an off state in which operation of all zones of the transport conveyor is stopped.

The disadvantage of conventional transport conveyors is that, during operation, all zones of the conveyor are typically in operation even though a large proportion of the conveyor is not transporting a load at any given time. In other words, each zone operates continuously even though the zone may not be in the process of transporting a load. This results in a waste of energy and generation of unnecessary noise in the vicinity of the conveyor. Further, all moving parts of the conveyor are continuously being subjected to mechanical wear.

While it is possible to control operation of a transport conveyor by providing a sensor to control operation of the motor such that the zone is only operable when it is transporting a load, adding a sensor to each zone results in additional cost and creates the need for a communication system for transmitting information throughout the length of the conveyor regarding the full or empty state of each zone to the adjacent zones.

It is an object of the present invention to provide a transport conveyor which eliminates the need for an external sensor and which functions to operate each zone only when necessary to transport a load on the zone. It is a further object of the invention to provide such a conveyor which utilizes a conventional drive system for operating a conveyor zone. A further object of the invention is to provide such a conveyor which is relatively simple in its components and operation and which eliminates the cost associated with an external sensor. A still further object of the invention is to provide such a conveyor which takes advantage of available technology in order to provide selective operation of conveyor zones.

In accordance with one aspect of the invention, a conveyor arrangement for transporting a load, and which defines an upstream end and a downstream end, includes a rotatable conveying member and a motor drivingly interconnected with the conveying member and including a rotatable output member. The conveyor arrangement is constructed and arranged such that advancement of a load thereon upstream of the conveying member results in rotation of the conveying member and thereby rotation of the rotatable output member of the motor. A control arrangement is interconnected with the motor for initiating operation of the motor in response to rotation of the rotatable motor output member and for maintaining operation of the motor for a period of time sufficient to enable a load on the conveyor assembly to pass downstream of the rotatable conveying member. The control arrangement is operable to thereafter stop operation of the motor to stop rotation of the rotatable conveying member. The rotatable conveying member may be in the form of a drive roller with which the motor output member is rotatably interconnected, and the conveyor arrangement may be in the form of a series of driven rollers including an upstream driven roller and a downstream driven roller. A drive arrangement interconnects adjacent driven rollers for driving the driven rollers in response to rotation of the drive roller. The drive arrangement is operable to transfer rotation of the upstream driven roller to the drive roller upon advancement of a load onto the upstream driven roller, for initiating operation of the motor. The control arrangement includes at least one sensor for detecting rotation of the rotatable motor output member and for providing an input in response thereto, and a motor control for operating the motor in response to the sensor input. In a preferred form, the motor may be a brushless DC motor and the sensor may be a Hall Effect sensor. The motor control is preferably operable so as to operate the motor for a predetermined time period after initiation of motor operation in response to the sensor input, sufficient to allow the load to be discharged from the conveyor arrangement. The motor control may be operable to allow the motor to coast subsequent to expiration of the predetermined time period. While the motor is coasting, subsequent advancement of a load onto the conveyor arrangement upstream of the conveying member is detected by the at least one sensor to provide a subsequent sensor input to the motor control to re-initiate operation of the motor for the predetermined time period. The motor control may also include a dynamic brake control to stop rotation of the motor and thereby rotation of the rotatable output member. The motor control is preferably responsive to a stop input to operate the brake so as to positively stop operation of the motor. The stop input may be provided from a stop input line interconnected with the motor control and responsive to a condition external of the conveyor arrangement for providing the stop input to the motor control.

In accordance with another aspect of the invention, a conveyor arrangement for transporting a load, and defining an upstream end and a downstream end, includes a rotatable conveying member and a motor drivingly engaged with the rotatable conveying member through a rotatable motor output member. A control arrangement is interconnected with the motor for controlling operation of the motor. The conveyor arrangement is constructed and arranged to impart rotation to the rotatable conveying member as a load is advanced in a downstream direction toward the conveying member and to thereby impart rotation to the rotatable motor output member. The control arrangement is operable to operate the motor upon rotation of the rotatable output member for a period of time sufficient to enable the load to pass downstream of the rotatable conveying member, and to thereafter stop operation of the motor to cut off the supply of power to the rotatable motor output member.

In accordance with yet another aspect of the invention, a transport conveyor assembly, which extends between an upstream end and a downstream end, includes a series of rotatable conveyor rollers, a motor including a rotatable output member drivingly interconnected with a drive conveyor roller for imparting rotation thereto in response to operation of the motor, and a drive arrangement interconnecting the drive conveyor roller with the remainder of the conveyor rollers, which are driven rollers, so as to impart rotation thereto in response to rotation of the drive conveyor roller. Advancement of a load onto the upstream end of the conveyor assembly engages the upstream driven roller, which is operable to impart rotation to the drive roller through the drive arrangement. This rotation of the driven roller is transferred to the rotatable motor output member. A controller is interconnected with the motor and is operable to initiate operation of the motor in response to rotation of the rotatable motor output member. The controller is also operable to maintain operation of the motor for a time sufficient to enable the load to pass from the downstream end of the conveyor assembly, and to thereafter stop operation of the motor after the load has passed from the downstream end of the conveyor assembly. In this manner, the motor stops the supply of power to the rotatable motor output member and thereby to the drive conveyor roller and the driven conveyor rollers interconnected therewith through the drive arrangement.

The invention also contemplates a method of operating a conveyor assembly to advance a load thereon, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a top plan view showing portions of adjacent zones of a transport conveyor constructed according to the invention;

FIG. 2 is a section view taken along line 2—2 of FIG. 1, showing the internal components of a drive conveyor roller;

DETAILED DESCRIPTION OF THE INVENTION

Figure 3:
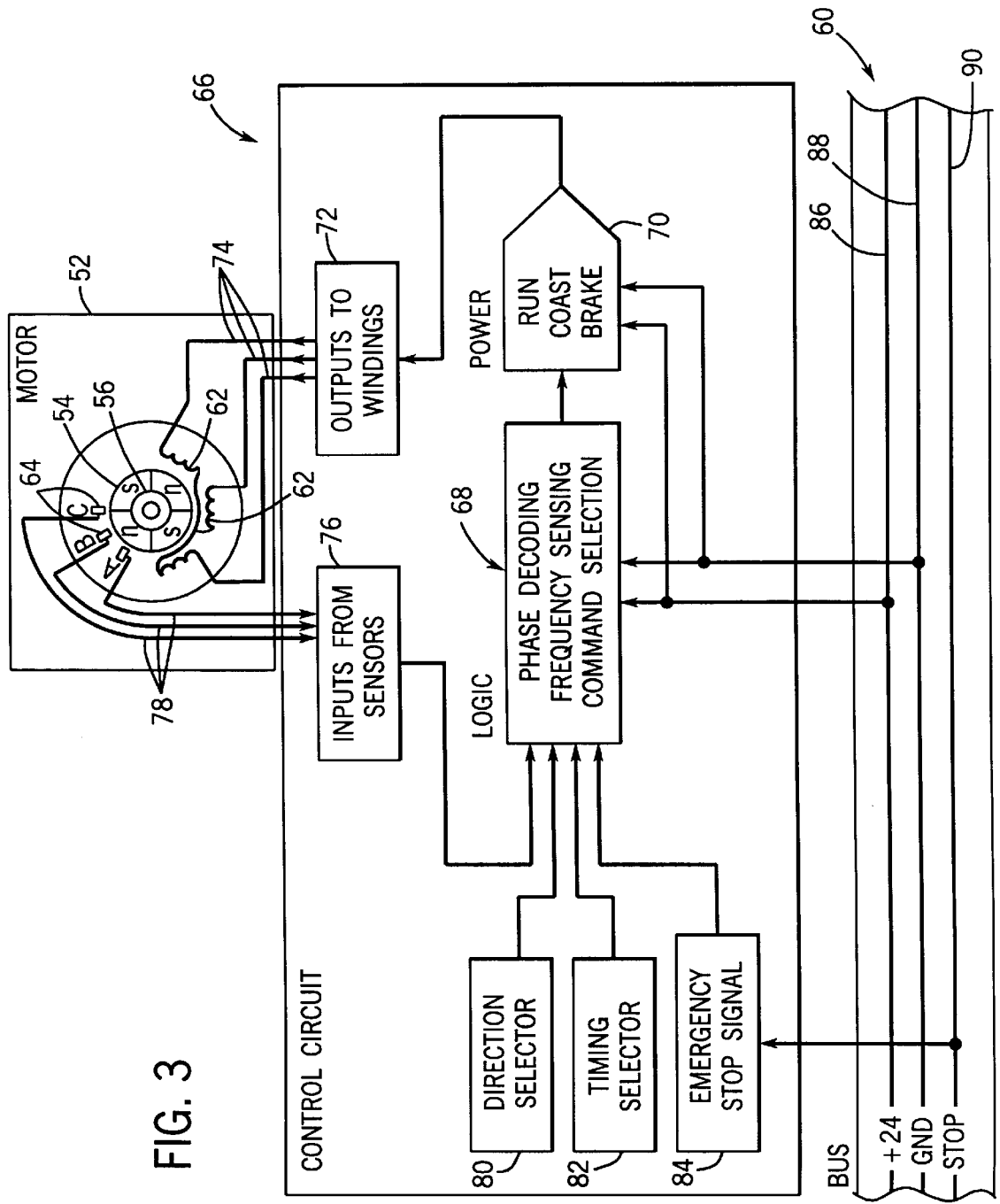
FIG. 3 is a schematic view illustrating the motor and control circuit incorporated into the drive roller of FIG. 2.

Referring to FIG. 1, a transport conveyor assembly includes adjacent conveyor zones, two of which are shown at 10a and 10b, for transporting loads in a downstream direction indicated by arrow 12. Zone 10a defines an upstream end (not shown) and a downstream end located adjacent the upstream end of zone 10b, such that loads are continually transferred from zone to zone so as to transport loads from an upstream end to a downstream end of the overall conveyor assembly.

Each of the conveyor zones, such as 10a and 10b, are constructed substantially identically and the following description with respect to zone 10a is understood to apply equally to the remaining zones.

Referring to FIG. 1, zone 10a includes a pair of side rails or frame members 14, 16. A series of roller assemblies are rotatably supported by and between frame members 14,16 and include a drive roller assembly 18 and a series of driven roller assemblies 20. A drive member, such as a belt 22, is engaged between drive roller assembly 18 and each adjacent driven roller assembly 20, as well as between each adjacent pair of driven roller assemblies 20. In this manner, rotary power from drive roller assembly 18, supplied in a manner to be explained, is transferred to each driven roller assembly 20 in zone 10a so at to rotate each driven roller assembly 20 in response to operation of drive roller assembly 18.

Referring to FIG. 2, drive roller assembly 18 includes a generally cylindrical roller member 24 defining a peripheral annular engagement wall 26 and spaced end walls 28, 30. Engagement wall 26 and end walls 28, 30 of roller member 24 cooperate to define a roller interior 32.

A support shaft 34 is mounted to frame member 14 and extends through an opening 36 formed in end wall 28 into roller member interior 32. A bearing 38 is interposed between support shaft 34 and the internal surface of engagement wall 26 for rotatably supporting the end of roller member 24 adjacent frame member 14. Similarly, a support shaft 40 is mounted to frame member 16 and extends through an opening 42 in roller member end wall 30 into roller member interior 32. A bearing 44 is interposed between support shaft 40 and the internal surface of engagement wall 24 for rotatably supporting the end of roller member 24 adjacent frame member 16. In this manner, roller member 24 is rotatably supported by and between frame members 14 and 16.

A carrier 46 is interconnected with the inner end of support shaft 40 and is located within roller member interior 32. A gear reducer 48 is engaged within the inner end of carrier 46. Gear reducer 48 includes an output member 50 secured to the internal surface of engagement wall 26.

A motor 52 is secured to gear reducer 48 and is located within the interior of carrier 46. Motor 52 is preferably a 4 pole 3-phase brushless DC motor, and includes a permanent magnet rotor 54 for providing rotary output power which is transferred to gear reducer 48 through a motor output shaft 56. Output power from motor 52 is supplied to gear reducer 48, which transmits output power to the gear reduction of gear reducer 48 to output member 50. In this manner, operation of motor 52 functions to impart rotation to roller member 24.

A series of electrical connections 58 extend through a passage defined by support shaft 40 and into the interior of carrier 46 for engagement with motor 52. Electrical connections 58 include a power supply and ground, as well as other electrical lines operable to control the functioning of motor 52 in a manner to be explained. Electrical connections 58 are carried externally of the conveyor frame by a bus 60 which extends along the run of the conveyor and interconnects the conveyor zones with each other.

FIG. 3 illustrates motor 52 including rotor 54 and output shaft 56. Motor 52 includes a series of windings 62 to which electrical power is selectively supplied in order to control rotation of rotor 54, in a manner as is known.

A series of sensors 64 are mounted to the housing of motor 52 adjacent rotor 54. Sensors 64 may be of any satisfactory type and, in a preferred embodiment, are Hall Effect sensors.

A motor control circuit 66 is interconnected between bus 60 and motor 52, and may be contained within roller interior 32 and mounted to motor 52. Motor control circuit 66 includes a processor 68 having an output interconnected with a motor control module 70. In turn, motor control module 70 has an output interconnected with an output module 72 for supplying power thereto, which in turn is supplied to windings 62 through a series of power supply lines 74, each of which supplies power to one of windings 64.

Motor control circuit 66 further includes an input module 76 which receives inputs from sensors 64 via sensor input lines 78, and input module 76 in turn provides as inputs to processor 68. Additional inputs are provided to processor 68 from a direction selector module 80, a timing selector module 82 and an emergency stop module 84.

As noted previously, bus 60 carries a power supply line, shown at 86, as well as a ground line, shown at 88. Power supply line 86 and ground line 88 are interconnected with processor 68 and with motor control module 70 for providing input power thereto. In addition, bus 60 carries a stop line 90 which provides an input to emergency stop module 84.

Operation of conveyor zone 10a is as follows, with the understanding that this description applies to any similarly constructed conveyor zones such as 10b for transporting a load in an upstream to downstream direction.

Figure 4:
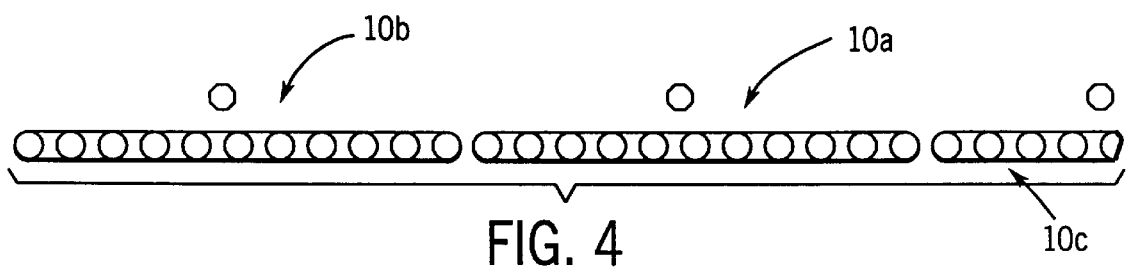
FIGS. 4–8 are schematic side elevation views showing operation of adjacent transport conveyor zones constructed according to the invention, each of which incorporates a motor and control circuit as in FIG. 3.
Figure 5:
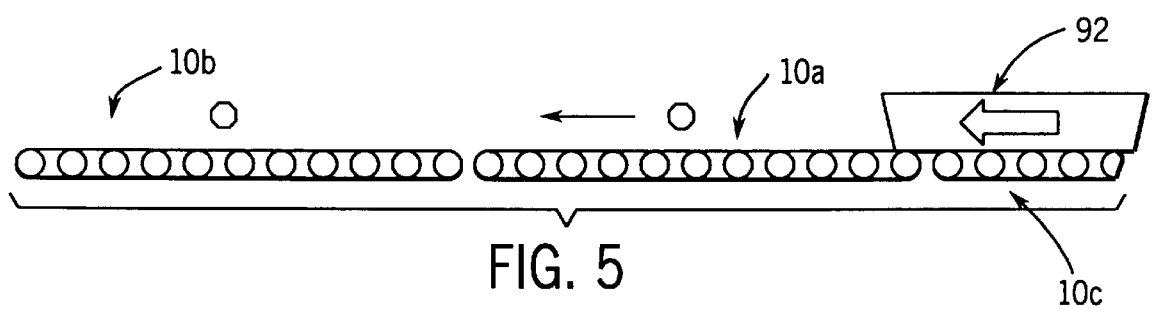

As a load advances toward the upstream roller assembly of conveyor zone 10a, conveyor zone 10a is at rest such that neither drive roller 18 nor any of driven rollers 20 are rotating. This condition is shown in FIG. 4. When a load, such as shown at 92 in FIG. 5, engages the upstream driven roller assembly 20 of zone 10a, friction between the underside of load 92 and the engagement wall, such as 26, of driven roller assembly 20 results in rotation being imparted to the upstream driven roller assembly 20 due to the inertia of load 22 as it engages upstream driven roller 20. While movement of load 92 is illustrated as a result of operation of an upstream conveyor zone such as shown at 10c in FIGS. 4–8, it is understood that movement of load 92 may also be the result of manual placement of load 92 into engagement with the upstream driven roller assembly 20 and exertion of a pushing force onto the load in a downstream direction.

Figure 6:
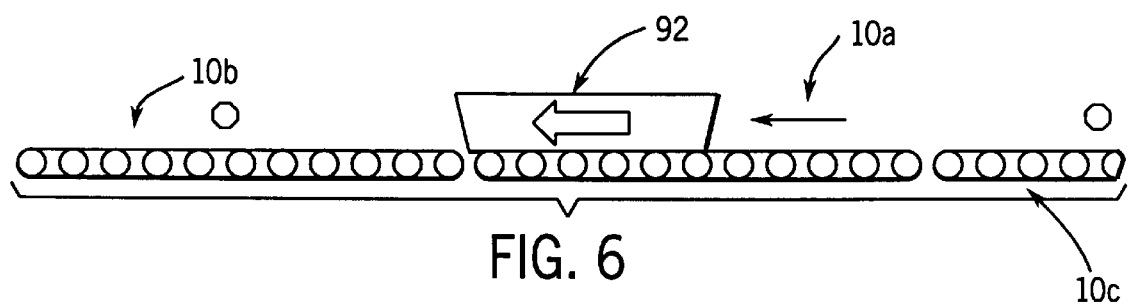
Figure 7:
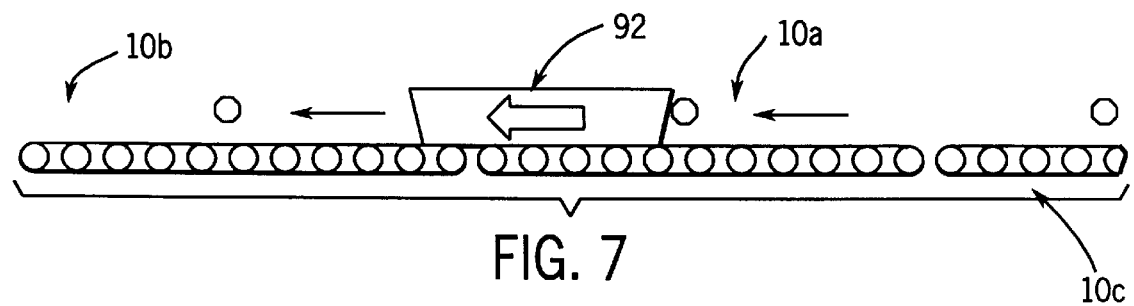
Figure 8:
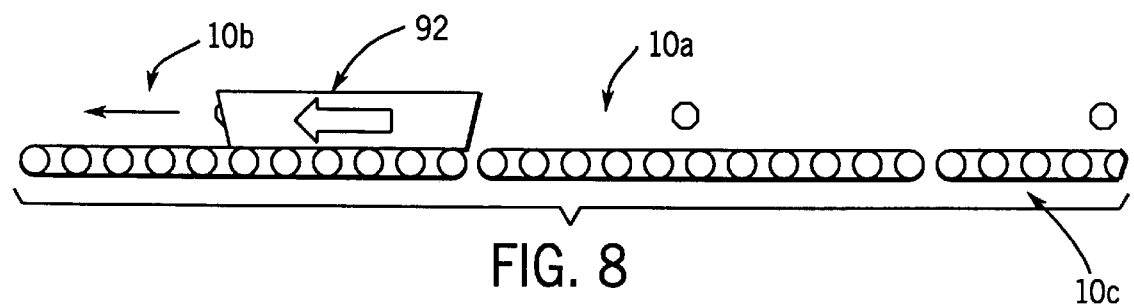

Once initial rotation is imparted to the upstream driven roller assembly 20 by the inertia of load 92 as it engages upstream driven roller assembly 20, such rotation of upstream driven roller assembly 20 is transferred through belt 22 to drive roller 18 and to the remainder of driven roller assemblies 20. When such rotation is imparted to drive roller assembly 18, this results in rotation of output member 50 which is transferred through gear reducer 48 to motor output shaft 56, resulting in rotation of rotor 54 within the housing of motor 52. This rotation of rotor 54 is detected by sensors 64, which functions to provide inputs through sensor input lines 78 to input module 76 of control circuit 66. Input module in turn provides an input to processor 68 in response to rotation of rotor 54, and processor 68 then provides an output to motor control module 70 to initiate operation of motor 52. Motor control module 70 functions to supply power to output module 72, which is provided to windings 62 through output lines 74 so as to initiate operation of motor 52 and to thereby impart rotation to drive roller assembly 18 through motor output shaft 56, gear reducer 48 and output member 50. This rotation of drive roller assembly 18 is transferred through belts 22 to the remainder of driven roller assemblies 20, so as to advance load 92 on conveyor zone 10a in a manner as shown in FIG. 6. Processor 68 continues to supply a run output to motor control module 70 for a predetermined time period, in accordance with an input from timing selector module 82, sufficient to ensure that load 92 has been completely discharged from zone 10a based on the length of zone 10a and the speed of operation of drive roller assembly 18 and driven roller assemblies 20 in response to operation of motor 52. Once the predetermined time period has expired, processor 68 provides a coast output to motor control module 70, which functions to cut off the supply of power to output module 72 and thereby to windings 62. When this occurs, motor 54 continues rotating in a non-powered manner and, eventually, drive roller assembly 18 and driven roller assemblies 20 come to a stop due to frictional forces.

Sensors 64 continue to provide inputs to input module 76 at all times during rotation of rotor 54. Processor 68 performs a frequency sensing function in response to sensor inputs from input module 76, which indicates a decay in frequency as rotor 54 coasts in the non-powered mode. Upon engagement of a subsequent load with upstream driven roller 20, an increase in frequency is detected by transmission of rotation of the upstream driven roller assembly 20 through belts 22 to drive roller assembly 18, and this increase in frequency is detected by processor 68, resulting in output of a run signal to motor control module 70 to reestablish the supply of power to windings 62 and to thereby drive rotor 54 to power drive roller assembly 18 and driven roller assemblies 20. Operation of motor 54 is again maintained for the same predetermined time period as discussed previously, in order to fully discharge the subsequent load from conveyor zone 10a. If subsequent loads are not forthcoming, roller assemblies 18, 20 eventually come to a stop in preparation for engagement of another load with the upstream driven roller assembly 20.

In certain circumstances, an input is provided from stop supply line 90 to emergency stop module 84. As noted previously, stop supply line 90 runs the whole length of the overall assembly made up of a series of conveyor zones such as 10a and 10b, and may include switches, such as shown at 94, at periodic intervals which can be actuated by an operator in order to stop all operation of the conveyor assembly. In such a situation, the stop input from stop line 90 is provided to processor 68 through emergency stop module 84 which, in response, provides an output to motor control module 70 which causes all windings 62 to be shorted to ground. Any rotation of rotor 54 is then resisted by dynamic braking, in accordance with conventional technology, which quickly stops rotation of rotor 54 and thereby drive roller assembly 18 and driven roller assemblies 20, to stop advancement of any load carried by the conveyor zone. In this manner, actuation of a switch at any location along the length of the overall conveyor system can quickly bring operation of the entire system to a halt.

Alternatively, a stop signal can be supplied from stop line 90 if an accumulating type conveyor is located at the discharge end of the transport conveyor assembly and if the accumulating conveyor control system detects that all of the space on the accumulating conveyor is occupied and the accumulating conveyor can receive no more additional loads. In a circumstance such as this, the accumulating conveyor control provides a stop signal to stop line 90 so that operation of all transport conveyor zones can be stopped, in a non-emergency condition, to enable the accumulating conveyor to cycle through and to make space available for incoming loads from the transport conveyor system.

In either condition, once operation of the transport conveyor is to be resumed, power is restored to stop line 90 which is detected by processor 68 through stop signal module 84, and processor 68 functions to cycle zone 10a for the predetermined run time in order to discharge any packages carried by the zone and to restart operation as described above. In a preferred form, processor 68 of each zone, such as 10a, is operable to detect whether the zone is in operation or at rest when a stop signal is received from stop line 90. If the zone was in operation at the time the stop signal is received, the zone processor functions to resume operation when power is restored to stop line 90 and to cycle the zone for a predetermined run time in order to discharge any packages carried by the zone onto the zone downstream therefrom, and to resume operation as described above. If the particular zone was not in operation at the time the stop signal was received, the zone remains at rest when power is restored to stop line 90 and commences operation when a load is received on the zone, also as described above.

Direction selector module 80 of control circuit 66 provides an input to processor 68 indicative of the correct direction of travel for advancing loads on zone 10a. In this manner, the direction of rotation of rotor 54 as caused by introduction of a load into zone 10a is determined according to the sequence of inputs from sensors 64, and is compared to the input of direction selector module 80 so as to ensure that the load introduced into the zone is traveling in the desired direction. Once processor 68 makes this determination, the output of processor 68 is provided to motor control module 70 to operate motor 54 as described above to advance the load thereon.

The functions performed by the various components of motor control circuit 66 are carried out using conventional programming techniques and programmable hardware.

It can thus be appreciated that the invention provides a system for automatically initiating operation of a conveyor zone for a predetermined time period in order to advance a load thereon, without the need for an external sensor to detect whether a load is present on the zone. Each zone simply operates for a predetermined time period every time an inertial force is exerted on the upstream end of the zone, and operation of the zone motor is stopped automatically to save energy and wear when the zone is not in use. The invention thus achieves significant cost savings in conveyor operation and maintenance.

The invention can be used in any application for a transport conveyor. Representatively, the invention can be used to create a free standing conveyor zone which does not require a control system. For example, the invention can be used to provide a lift gate conveyor zone installed between sections of belt-driven or line shaft type conveyors where a mechanical linkage to a moveable conveyor section is difficult using conventional technology. In addition, the invention can be used to drive a powered curved conveyor zone using zones consisting of interlinked tapered roller assemblies.

Various alternatives and embodiments are contemplated as being within the scope of the following claims particularly pointing out and distinctly claiming the subject matter regarded as the invention.

I claim:

1. A conveyor arrangement, having an upstream end and a downstream end, for transporting a load, comprising:
    a rotatable conveying member;
    a motor drivingly interconnected with the conveying member and including a rotatable output member;
    wherein the conveyor arrangement is constructed and arranged such that advancement of the load thereon upstream of the conveying member results in rotation of the conveying member and thereby rotation of the rotatable output member; and
    a control arrangement interconnected with the motor for initiating operation of the motor in response to rotation of the rotatable output member and maintaining operation of the motor for a period of time sufficient to enable the load to pass downstream of the rotatable conveying member, and for thereafter stopping operation of the motor to stop rotation of the rotatable conveying member.

2. The conveyor arrangement of claim 1, wherein the rotatable conveying member comprises a drive roller with which the rotatable motor output member is drivingly interconnected, and wherein the conveyor arrangement comprises a series of driven rollers including an upstream driven and a downstream driven roller, and a drive arrangement interconnecting adjacent driven rollers for driving the driven rollers in response to rotation of the drive roller.

3. The conveyor arrangement of claim 2, wherein the drive arrangement is operable to transfer rotation of the upstream driven roller to the drive roller upon advancement of a load onto the upstream driven roller for initiating operation of the motor.

4. The conveyor arrangement of claim 1, wherein the control arrangement includes at least one sensor for detecting rotation of the rotatable motor output member and providing an input in response thereto, and a motor control for operating the motor in response to the sensor input.

5. The conveyor arrangement of claim 4, wherein the motor comprises a brushless DC motor and wherein the at least one sensor comprises a Hall Effect sensor.

6. The conveyor arrangement of claim 4, wherein the motor control is operable to operate the motor for a predetermined time period after initiation of motor operation in response to the sensor input.

7. The conveyor arrangement of claim 6, wherein the motor control is operable to allow the motor to coast subsequent to expiration of the predetermined time period, and wherein subsequent advancement of a load onto the conveyor arrangement upstream of the conveying member is detected by the at least one sensor to provide a sensor input to the motor control to re-initiate operation of the motor for the predetermined time period.

8. The conveyor arrangement of claim 6, wherein the motor control includes a brake for positively stopping operation of the motor and rotation of the rotatable output member.

9. The conveyor arrangement of claim 8, further comprising means for providing a stop input to the motor control, and wherein the motor control is responsive to the stop input to operate the brake for positively stopping operation of the motor and rotation of the rotatable output member.

10. The conveyor arrangement of claim 9, wherein the means for providing a stop input to the motor control comprises a stop input line interconnected with the motor control and responsive to a condition external of the conveyor arrangement for providing the stop input to the motor control.

11. A conveyor arrangement having an upstream end and downstream end for transporting a load, comprising:
   a rotatable conveying member;
   a motor drivingly engaged with the rotatable conveying member and including a rotatable output member; and
   a control arrangement interconnected with the motor for controlling operation of the motor;
   wherein the conveyor arrangement is constructed and arranged to impart rotation to the rotatable conveying member as a load is advanced in a downstream direction toward the conveying member and to thereby impart rotation to the rotatable motor output member; and
   wherein the control arrangement is operable to operate the motor upon rotation of the rotatable motor output member for a period of time sufficient to enable the load to pass downstream of the rotatable conveying member, and to thereafter stop operation of the motor to stop rotation of the rotatable output member.

12. A method of operating a conveyor assembly to advance a load thereon, wherein the conveyor assembly includes a rotatable conveying member and a motor drivingly engaged with the rotatable conveying member for supplying rotary power thereto, comprising the steps of:
   stopping operation of the motor to stop the supply of rotary power to the rotatable conveying member;
   advancing a load toward the conveying member;
   imparting rotation to the rotatable conveying member in response to advancement of the load toward the conveying member;
   initiating operation of the motor in response to rotation of the rotatable conveying member;
   operating the motor to rotate the conveying member and to thereby advance the load past the conveying member; and
   subsequently stopping operation of the motor to stop the supply of rotary power to the rotatable conveying member.

13. The method of claim 12, wherein the step of imparting rotation to the rotatable conveying member is carried out by engagement of a load with the rotatable conveying member.

14. The method of claim 13, wherein engagement of a load with the rotatable conveying member is carried out through engagement of the load with an upstream conveying member located upstream on the conveyor assembly from the first-mentioned conveying member and drivingly interconnected therewith, wherein rotation of the upstream conveying member is transferred to the first-mentioned conveying member so as to impart rotation to the first-mentioned conveying member.

15. The method of claim 12, wherein the step of operating the motor is carried out for a predetermined time period sufficient to advance the load past the conveying member and any additional conveying members driven by the first-mentioned conveying member.

16. The method of claim 12, wherein the motor is drivingly engaged with the rotatable conveying member through a rotatable motor output member, and wherein the motor output member is interconnected with the rotatable conveying member such that imparting rotation to the rotatable conveying member in response to advancement of the load toward the rotatable conveying member is operable to impart rotation to the motor output member, and wherein initiation of operation of the motor is carried in response to impartation of rotation to the rotatable output member.

17. The method of claim 16, wherein the step of initiating operation of the motor is carried out in response to an input from a sensor for detecting impartation of rotation to the rotatable motor output member in response to impartation of rotation to the rotatable conveying member.

18. The method of claim 12, wherein the step of subsequently stopping operation of the motor to stop the supply of rotary power to the rotatable conveying member is carried out by allowing the motor to coast so as to continue rotation of the rotatable conveying member.

19. The method of claim 12, wherein the motor includes a rotatable output member drivingly interconnected with the rotatable conveying member, and wherein the step of subsequently stopping operation of the motor to stop the supply of rotary power to the rotatable conveying member is carried out by applying a braking force to positively stop rotation of the motor output member.

20. The method of claim 19, wherein the step of applying a braking force is carried out in response to a stop signal external of the conveyor assembly.

21. A transport conveyor assembly extending between an upstream end and a downstream end for advancing a load, comprising:
   a series of rotatable conveyor rollers;
   a motor including a rotatable output member drivingly interconnected with a drive one of the conveyor rollers for imparting rotation thereto in response to operation of the motor;
   a drive arrangement interconnecting the drive conveyor roller with driven ones of the conveyor rollers for imparting rotation thereto in response to rotation of the drive conveyor roller;
   wherein advancement of a load onto the upstream end of the conveyor assembly is operable to engage an upstream one of the driven rollers and to impart rotation to the drive roller through the drive arrangement, to thereby impart rotation to the rotatable output member of the motor; and
   a controller interconnected with the motor, wherein the controller is operable to initiate operation of the motor in response to rotation of the rotatable output member; maintain operation of the motor for a time sufficient to enable the load to pass from the downstream end of the conveyor assembly; and subsequently stop operation of the motor after the load has passed from the downstream end of the conveyor assembly to stop the supply of rotary power to the rotatable output member.

* * * * *